Figure 9:
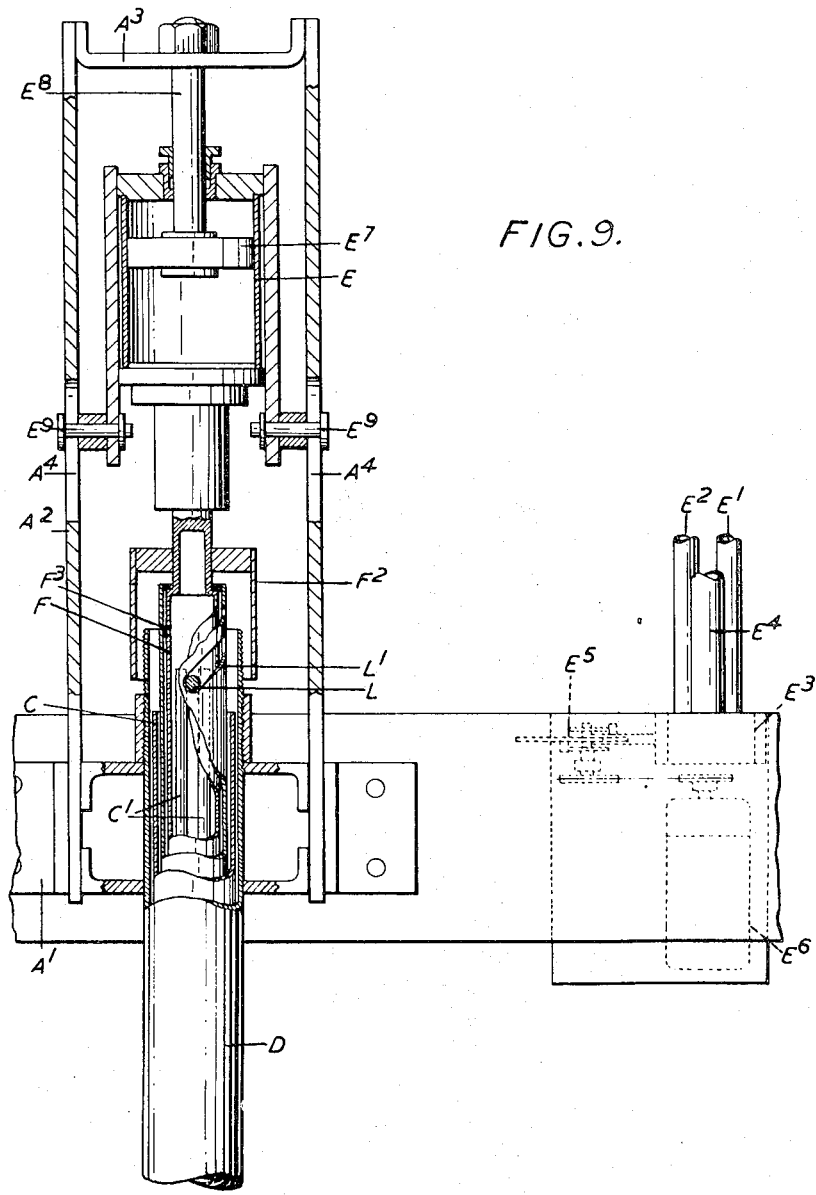

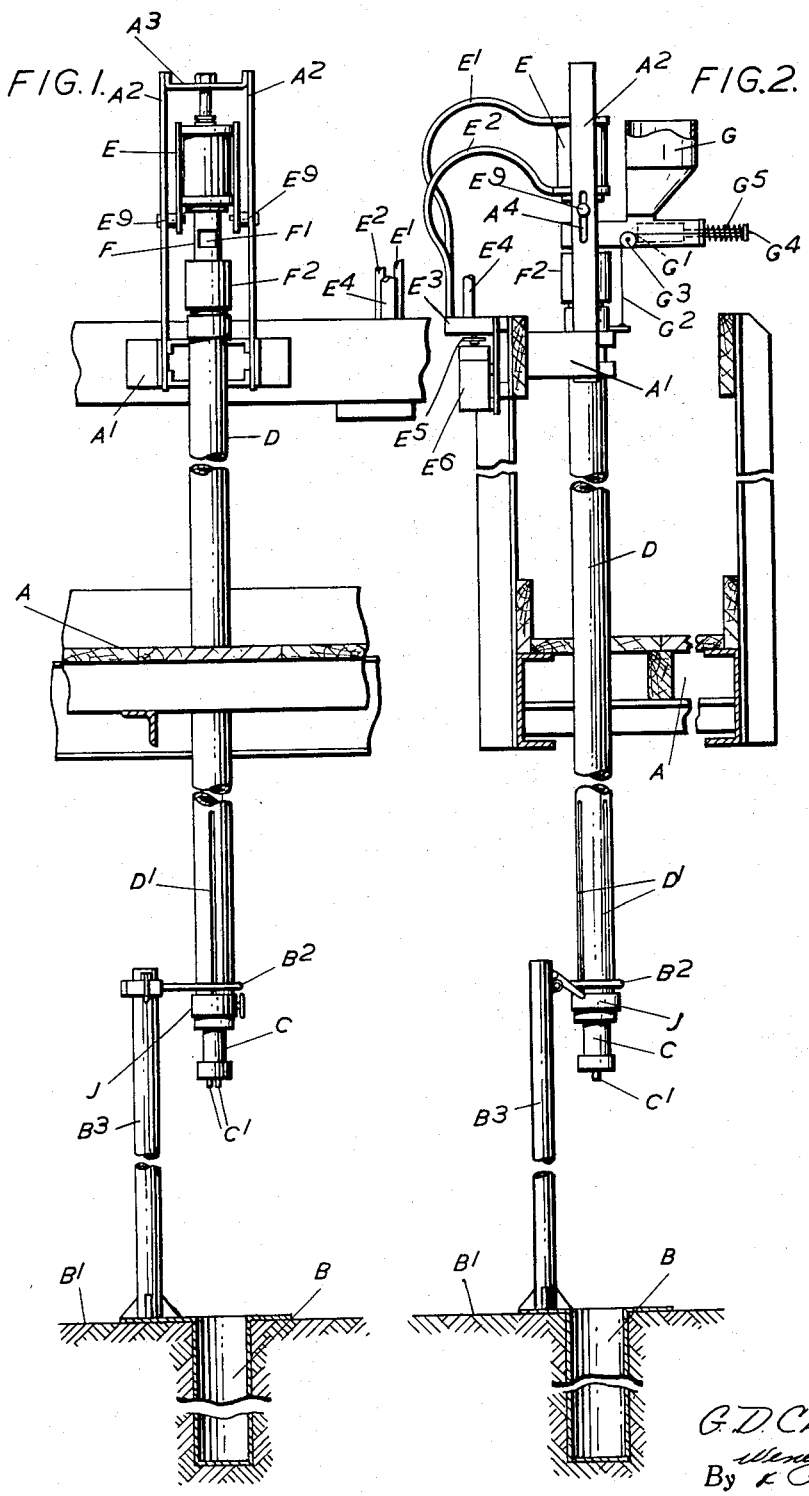

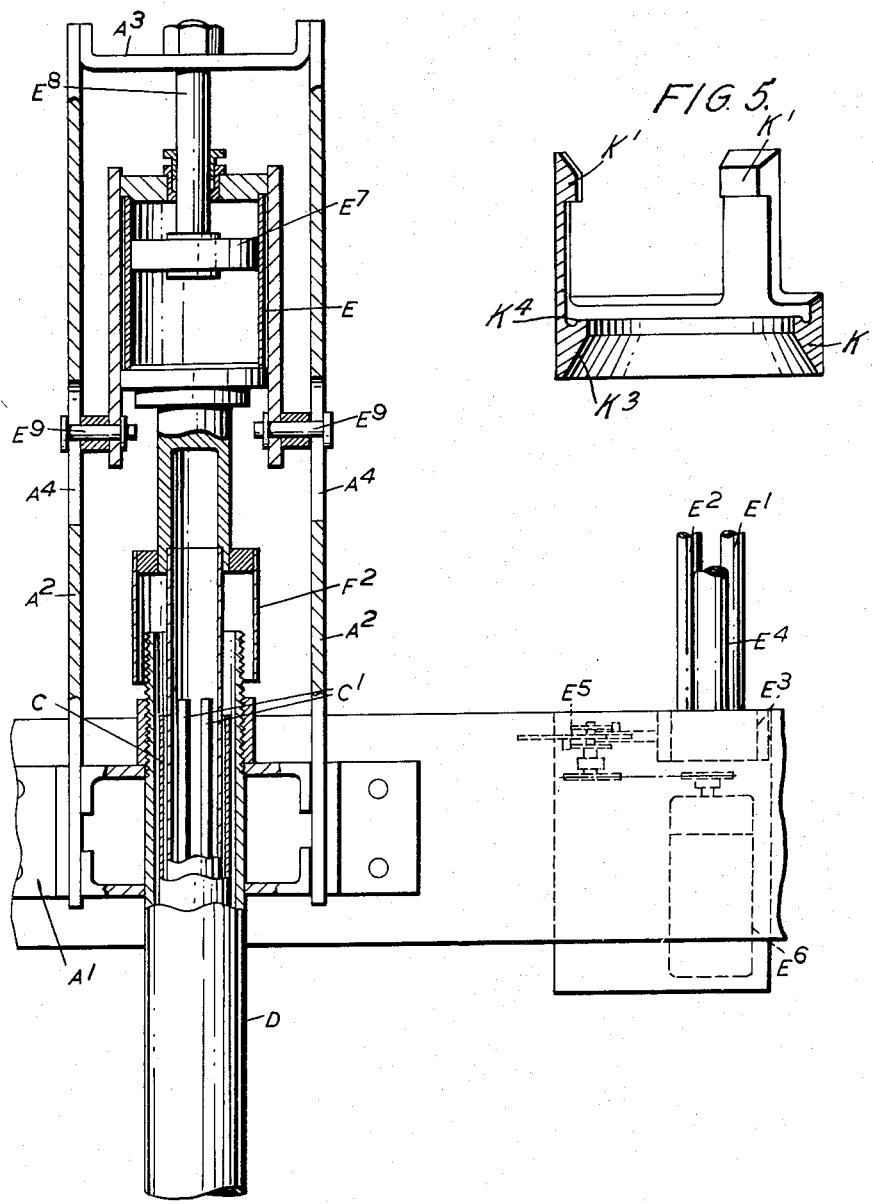

May 1, 1956 G. D. CLOTHIER 2,743,858
ELECTRIC CABLES OR OTHER INSULATED ELECTRIC CONDUCTORS
Filed Aug. 2, 1950 7 Sheets-Sheet 3
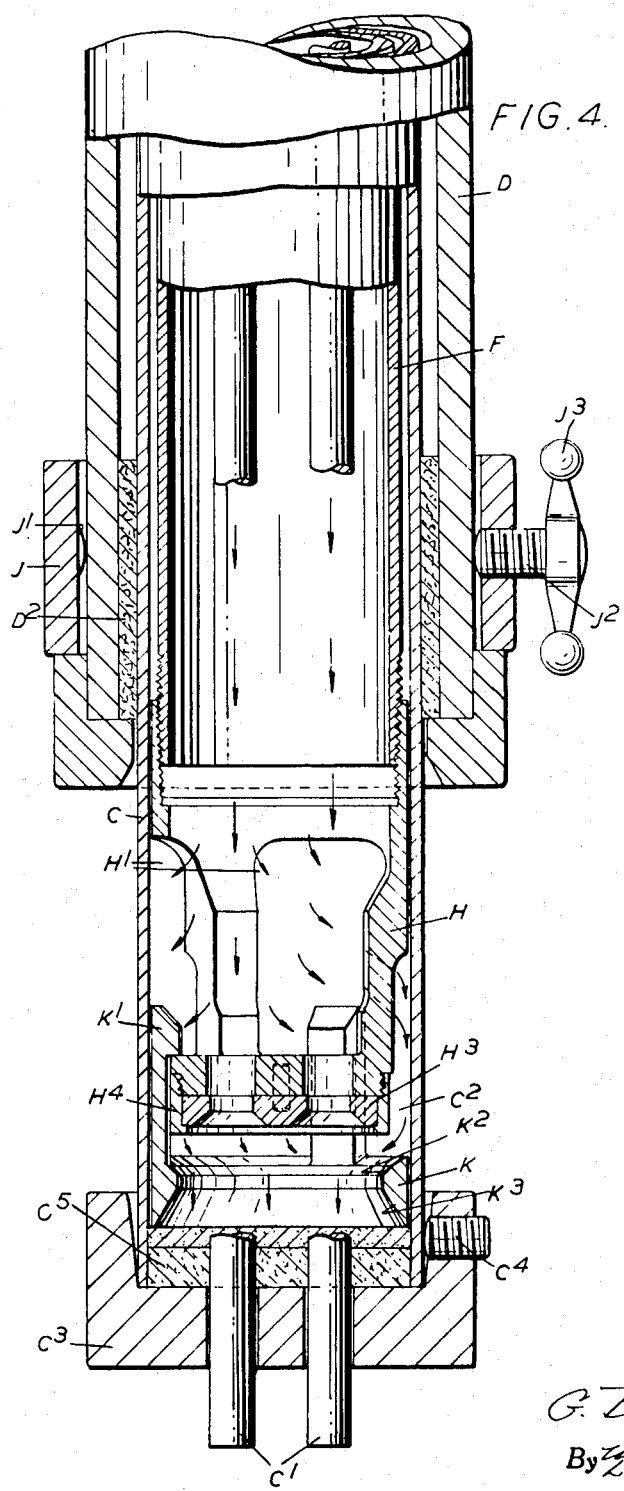
Inventor
G. D. CLOTHIER
By Wenderoth,
Lind & Ponack
Attorneys May 1, 1956 G. D. CLOTHIER 2,743,858
ELECTRIC CABLES OR OTHER INSULATED ELECTRIC CONDUCTORS
Filed Aug. 2, 1950 7 Sheets-Sheet 4
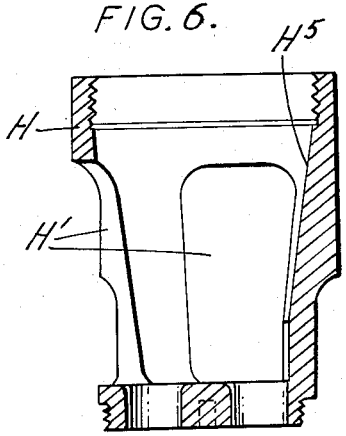
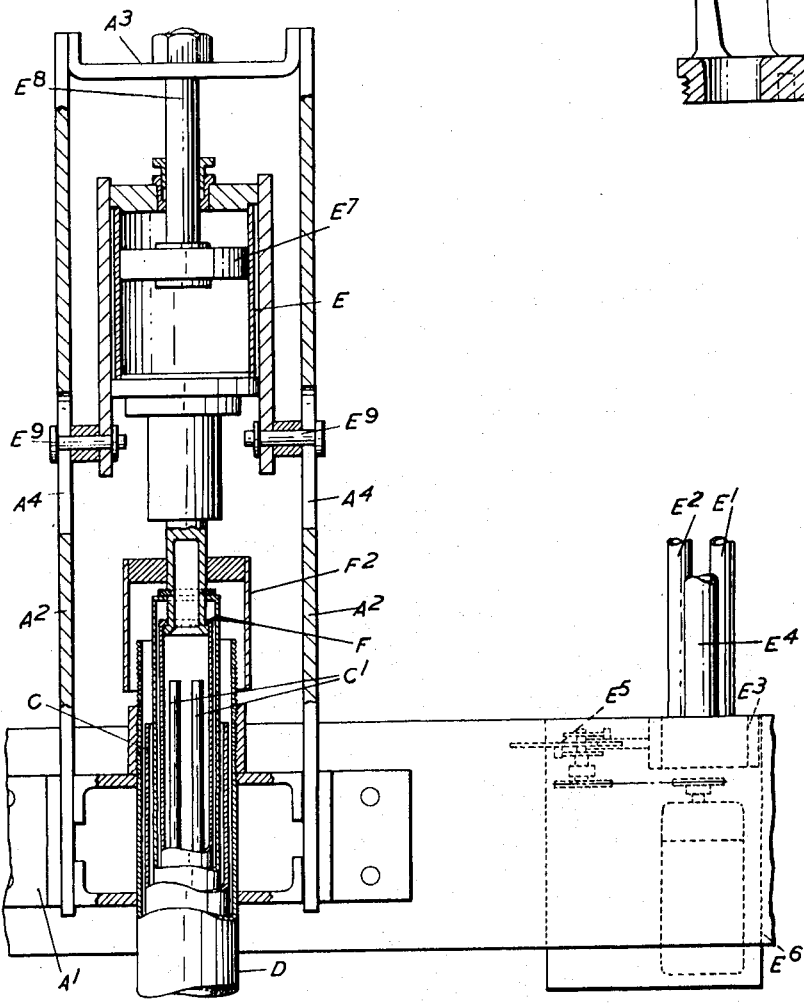
Inventor
G. D. CLOTHIER
By
Wenderoth, Lind and Ponack
Attorneys

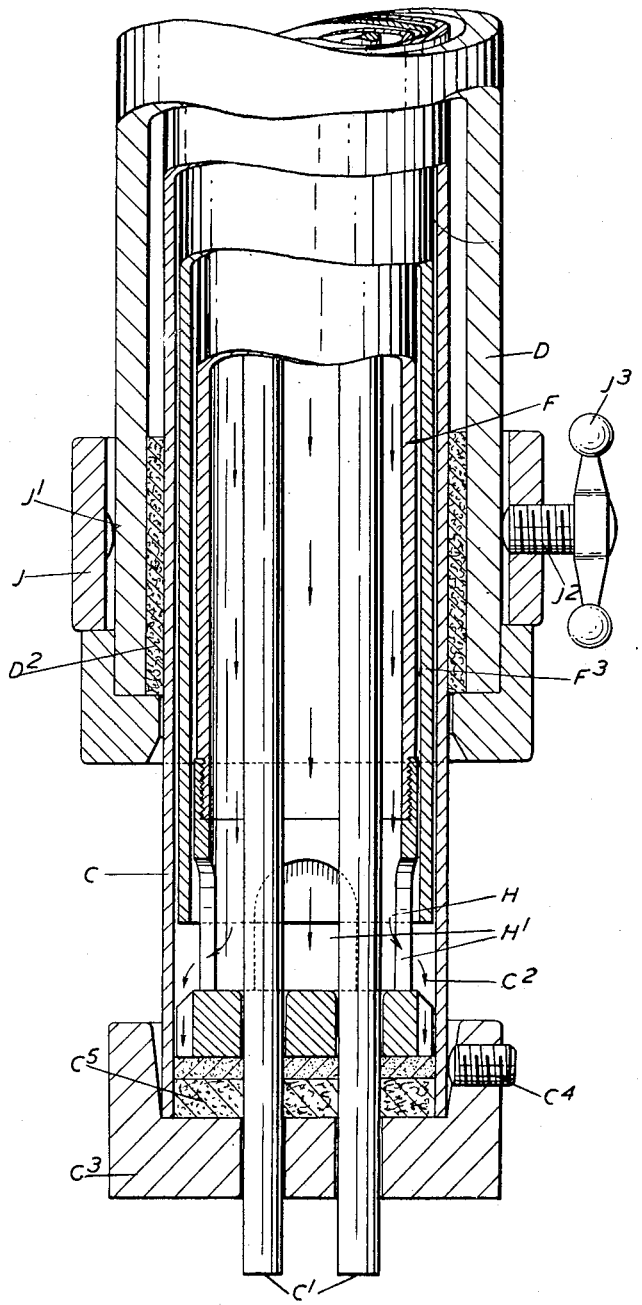

May 1, 1956 G. D. CLOTHIER 2,743,858
ELECTRIC CABLES OR OTHER INSULATED ELECTRIC CONDUCTORS
Filed Aug. 2, 1950 7 Sheets-Sheet 6

Inventor
G. D. CLOTHIER
By
Wendroth, Lind and Ponack
Attorneys

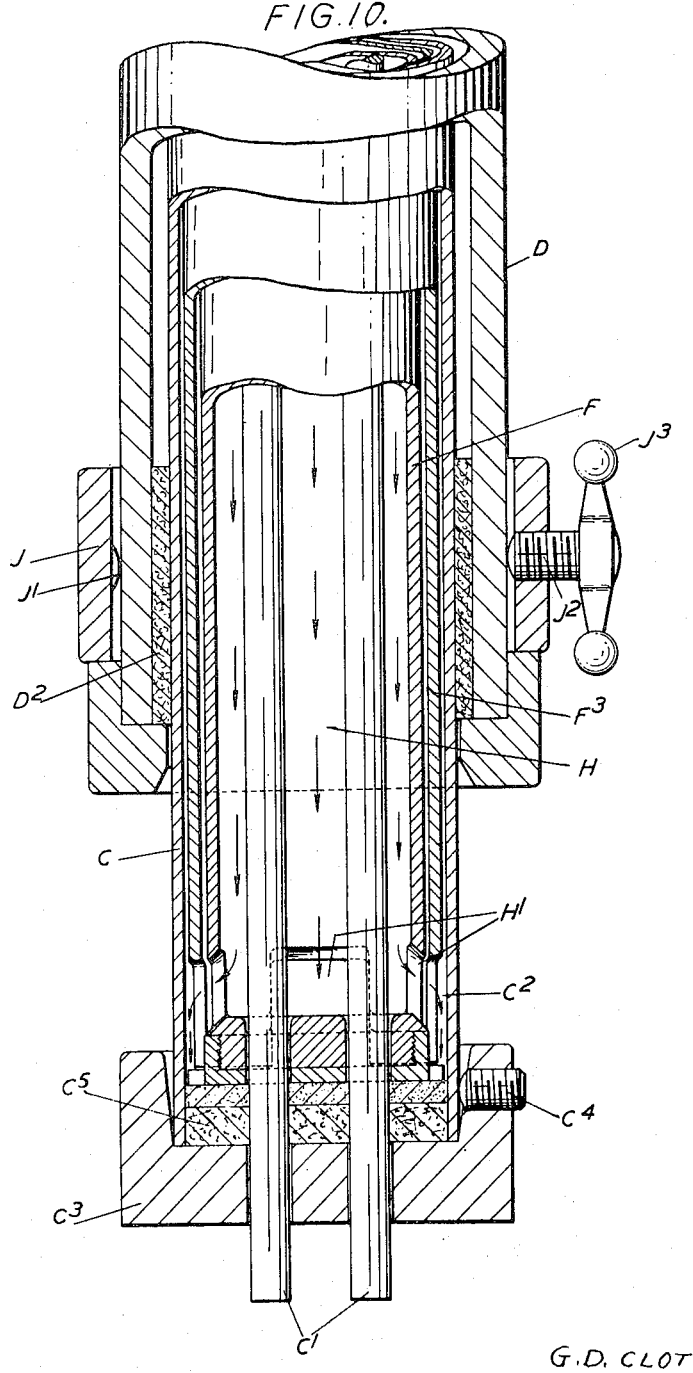

United States Patent Office 2,743,858
Patented May 1, 1956

2,743,858

ELECTRIC CABLES OR OTHER INSULATED ELECTRIC CONDUCTORS

George Donald Clothier, Newcastle-on-Tyne, England

Application August 2, 1950, Serial No. 177,199

Claims priority, application Great Britain August 9, 1949

15 Claims. (Cl. 226—24)

This invention relates to electric cables or other insulated conductors, for heating purposes, or for power conduction purposes, such as for lighting or control or low voltage power circuits, of the kind comprising a metal sheath separated from a conducting core or cores by pulverulent insulating material, such for example as magnesia, and to a process and apparatus for manufacturing such cables or conductors.

In the process according to the invention, the insulating material is fed in powder form to the interior of the sheath tube through one or more feed openings in the head of a ram which compacts the powder within the sheath tube, and such feed opening or openings are controlled by a valve. The valve may be closed at or before commencement of the compressive thrust of the ram on the column of powder in the sheath tube, and reopened when or shortly after the ram is retracted from such powder column.

Conveniently, the compressive thrust of the ram on the powder column in the sheath tube is brought about by relative longitudinal movement between the ram and the sheath tube, and a frictional device is provided to terminate such relative movement. Such frictional device preferably takes the form of a frictional abutment which opposes the compressive thrust and yields when the thrust exceeds a predetermined value, thereby permitting the ram and sheath tube to move together under the thrust, in the manner which in itself forms the subject of the present applicant's copending British patent application No. 20,408 of 1949. The relative longitudinal movement between the ram and the sheath tube is preferably effected by positively reciprocating the ram or the sheath tube.

The valve conveniently comprises a part carried by the ram head and a cooperating part freely suspended from the ram or the ram head so as to be movable longitudinally relatively thereto, whereby the valve closes automatically as the ram approaches the powder column in the sheath tube and opens automatically when the ram is retracted therefrom. The feed opening or openings are preferably located at or near the periphery of the ram head, and in such case the opening of the valve and the flow of powder therethrough may be assisted by the frictional resistance of the powder above it in contact with the wall of the sheath tube.

The feeding of the powder to the feed opening or openings may be effected in various ways, and may be assisted, if desired, by agitation or vibration of parts of the apparatus. Preferably, the ram is made hollow and the powder is fed to the sheath tube through the interior of the ram. Thus, the ram may comprise a hollow rod furnished with a detachable head having one or more apertures through which the core rod or core rods extend. The powder preferably escapes from the interior of the ram through lateral ports in its wall or in the wall of the head to an annular space around the head above the feed opening or openings. Such lateral ports and the parts of the ram or head adjacent thereto are preferably so shaped as to minimise risk of obstruction to the free flow of the powder, which otherwise might occur from the powder building up on projecting ledges and forming a powder "arch."

It is important to ensure that the core rod or rods will be properly positioned within the powder-filled sheath tube throughout its length, and for this purpose one of the two cooperating parts of the valve is preferably formed as a conical face to assist in properly centering the parts.

In order to minimise risk of the valve failing to close properly owing to the trapping of a coarse particle of the powder between its cooperating parts, it is preferable to effect valve contact by engagement of an edge (which is relatively sharp or only slightly chamfered) formed on one of the parts with a face formed on the other part. Thus the valve contact may be established between the peripheral edge of the ram head and a conical face formed on the inner surface of a ring constituting the relatively movable part of the valve. Alternatively, the contact may be established between a flat portion of the operating face of the ram head and an upstanding edge on such a valve ring.

After the filling process has been completed, the workpiece constituted by the sheath tube filled around the core rod or rods therein with powder compacted by the ram, may be subjected to one or more mechanical drawing stages, in order to elongate it into the form of an electric cable.

The invention may be carried into practice in various ways, but a convenient practical construction of cable-manufacturing apparatus according thereto, is illustrated by way of example in the accompanying drawings, in which Figures 1 and 2 respectively show the apparatus in front and side elevation.

Figure 3 is an enlarged view of the upper part of Figure 1 in central vertical section, Figure 4 is a similar view of the lower part showing a preferred valve construction, Figure 5 is a detached sectional view of the valve ring in an alternative valve construction, Figure 6 is a sectional view of a modified form of ram head.

Figure 7 is an enlarged view in section of the upper central part of the device of Figure 1 showing a modification of the longitudinal valve arrangement, Figure 8 is a sectional view of the lower part of Figure 1 showing a modification as in Figure 7, Figure 9 is an enlarged view in section of the upper central part of Figure 1 showing an alternative rotary valve arrangement, and Figure 10 is a sectional view of the lower part as in Figure 1 and Figure 9.

In this construction, the apparatus is arranged vertically and is carried by a tower or superstructure, which may take the form of a suitably supported gallery A above a well B in the ground, deep enough to take the length of the metal tube C, which will ultimately form the cable sheath, and of the conducting rod or rods $C^1$ which will form the cable core or cores. In the example illustrated, two core rods $C^1$ are shown for the manufacture of a two-core cable.

Suspended from a bracket $A^1$ on the gallery A, and reaching nearly to the ground surface $B^1$, is a fixed shroud tube D, which is in alignment with the well B and is likewise of a length to house the sheath tube C within it, a fixed eye $B^2$, carried on a pillar $B^3$ upstanding from the ground, being provided to ensure that the shroud tube remains in alignment with the well B. The same bracket $A^1$ also serves to carry upwardly projecting bars $A^2$ for supporting a driving machine, which may consist for instance of an electric motor or (as shown) of a double-acting pneumatic cylinder E fed at its ends through two flexible pipes $E^1E^2$ connected through a valve indicated at $E^3$ to a main supply pipe $E^4$ fed from a source of compressed air (not shown). The valve $E^3$ is driven through reduction gearing $E^5$ from a small electric motor $E^6$ mounted on the gallery A, the arrangement being such that the two pipes $E^1E^2$ are connected alternatively to the main supply pipe $E^4$ through the valve, the pipe $E^1$ or $E^2$ not connected at a particular moment to the pipe $E^4$ being opened by the valve $E^3$ to exhaust into the atmosphere. The piston $E^7$ (see Figure 3) in the cylinder E is carried by a rod $E^8$ fixed to a cross-bar $A^3$ on the two vertical supporting bars $A^2$, so that the cylinder E is caused to reciprocate up and down in accordance with the supply of compressed air through the pipes $E^1$ and $E^2$, the cylinder being guided by pins $E^9$ running in vertical slots $A^4$ in the supporting bars $A^2$.

Connected to the base of the cylinder E is a tubular ram F, which extends downwardly within the sheath tube C around the core rods $C^1$, this ram by its reciprocation serving to tamp the insulating powder in the sheath tube in a manner to be described in detail later. The powder which may consist for example of magnesia, is fed to the sheath tube C through the interior of the ram F, which is provided at its upper end with a feed opening $F^1$ for this purpose.

The powder feed mechanism may take various forms, but in the example illustrated it is itself carried by the ram and consists of a hopper G, into which the powder can be fed, by hand, or otherwise, and a reciprocating plunger $G^1$ below the hopper for pushing the powder through the feed opening $F^1$ in the ram F. The plunger $G^1$ is reciprocated in synchronism with the ram drive by means of a rope or chain $G^2$ passing over a pulley $G^3$ carried by the casing of the powder feed mechanism, one end of the rope $G^2$ being attached to the bracket $A^1$, whilst the other is secured to the end of a rod $G^4$ fixed to the plunger $G^1$. Thus whilst the ram F is moving upwards, the rope $G^2$ causes the plunger $G^1$ to advance to force powder into the ram, whilst on the downward stroke of the ram a spring $G^5$ pulls the plunger $C^1$ back again in readiness for the next feed stroke. A skirt $F^2$ is carried by the ram beneath the feed opening $F^1$ to prevent any ingress of dust from the powder into the shroud tube D.

It will be appreciated that other forms of powder feed mechanism may be used.

At its lower end (see Figure 4) the tubular ram F is provided with a preferably detachable head H having ports $H^1$ in its wall, through which the powder can escape from the interior of the ram through a feed opening $C^2$, which may consist of a continuous annular opening surrounding the operative lower end of the ram head within the sheath tube C or may be divided into a number of separate arcuate openings. The lower end of the ram head is closed by a plate having apertures through which the core rods $C^1$ can pass freely, and a disc $H^3$ is clamped beneath such plate by a clamping ring $H^4$. This disc $H^3$ is provided with guide apertures closely fitting the core rods $C^1$ and is made of a material to which the core rods will not adhere or seize as they slide through the guide apertures.

Suspended by hooks $K^1$, which engage into the lateral ports $H^1$ in the wall of the ram head H so as to hang on the apertured plate closing the lower end of the head, is a valve ring K, which fits within the sheath tube C with slight clearance. The valve ring K is thus free to move up or down to close or to open the annular feed opening $C^2$ around the ram head. The inner surface of the valve ring K is formed with a pair of opposed conical surfaces $K^2K^3$, of which the upper $K^2$ serves as a guide surface to direct the powder from the feed opening $C^2$ in a downward and inward direction and also as a valve seating for engagement with the peripheral edge of the clamping ring $H^4$ on the ram head, such edge preferably being given a slight chamfer so as to engage properly with the conical surface $K^2$ but only over a small area. The shape of the cooperating parts of the valve, and more particularly the smallness of the area of contact, is such as to ensure that the valve will close properly without being jammed by a coarse particle of the powder, any such particle being pushed to one side or the other of the contacting parts, the thickness of the annular contact strip being small enough to ensure this and yet large enough to take the compressive forces without damage.

The conical surfaces $K^2K^3$ on the valve ring K also assist in ensuring proper centering of the parts, so that the core rods $C^1$ are maintained accurately in their proper positions relatively to the sheath tube C throughout the length thereof. Thus, if owing to slight bending of the ram tube under the compressive forces, the ram head tends to move slightly towards one side of the sheath tube, powder will escape through on the opposite side and will thus tend to move the valve ring K towards such opposite side. Owing to the conical guide surface $K^2$ this will in turn exert a force on the end of the ram head tending to bring it back into the central position. At the same time, the lower conical surface $K^3$ projects into the powder column in the sheath tube and therefore tends to move transversely in the direction of flow of the powder, and thus tends to counteract any tendency of the ram head to move to one side.

An alternative form of the valve ring is shown in Figure 5, wherein the upper conical surface $K^2$ is replaced by an upstanding edge $K^4$ engaging with a flat portion of the face of the clamping ring $H^4$, the edge $K^4$ being sufficiently sharp to push away coarse particles but also sufficiently blunt to take the compressive forces without damage. With this arrangement the valve ring is free to float laterally and can therefore seat itself properly on the end face of the ram even though the ram may have moved out of proper centering. This alternative sacrifices the self-centering action, but satisfactorily avoids risk of failure to close the valve as the result of misalignment. In practice, however, it is usually practicable to employ the preferred valve ring shown in Figure 4 without such misalignment occurring.

In another alternative construction, the valve ring does not seat itself against the face of the ram head but slides over the cylindrical outer surface of the head, its upward movement relatively to the head being limited by extending the hook arms so that they can abut against the tops of the ports in the wall of the head.

The lower end of the shroud tube D is cut with slits $D^1$ to give it slight flexibility, and a liner $D^2$ of friction material, which may be similar to that commonly used for friction brake linings, is fitted in segments within the split end of the shroud tube D to fit closely around the sheath tube C. The pressure exerted by this liner $D^2$ on the surface of the sheath tube C is controlled by means of a ring J surrounding the shroud tube D and having internal studs $J^1$ engaging with the surface of the shroud tube. One of such studs $J^2$ is adjustably mounted in the ring J and can be screwed in or cut by means of a handwheel $J^3$, so as to clamp more tightly or to loosen the grip of the liner $D^2$ on the sheath tube C.

In operation, when it is desired to insert a new length of sheath tube for filling, this tube, after thorough cleaning of its inner and outer surfaces, is let down into the well B until its upper end is below the lower end of the shroud tube D and the ram F. The sheath tube C is then slipped over the end of the ram within the liner $D^2$, and raised (the friction grip at this stage having been loosened) until the lower end of the sheath tube is only a short distance below the lower end of the ram. The core rods $C^1$, after thorough cleaning, are then pushed up through the guide apertures in the disc $H^3$ (after fitting the valve ring K in position on the ram head), their lower ends being firmly secured to an anchoring plug $C^3$, which fits over the lower end of the sheath tube C and is clamped thereto at $C^4$. This plug $C^3$ thus seals the lower end of the sheath tube C, and it will usually be convenient to provide a packing wad $C^5$ of asbestos or other suitable material against the inside of the plug $C^3$ around the core rods $C^1$.

The friction grip handwheel $J^3$ is now operated to tighten the grip and clamp the sheath tube firmly, and the pneumatic device is set into operation to reciprocate the ram F, insulating powder having been poured into the hopper G. At first the ram reciprocates idly, while a small quantity of powder is being fed into the sheath tube C. During each upward stroke of the ram, the plunger $G^1$ pushes a charge of powder into the interior of the ram, and the powder falls down the ram under gravity (assisted if desired by vibration or agitation suitably applied to the parts) and passes through the ports $H^1$ and through the feed opening $C^2$ into the bottom of the sheath tube. The powder thus gradually builds up on the packing wad $C^5$ in the bottom of the sheath tube until it comes in contact with the ram face at the bottom of the downward stroke thereof. The friction grip is then gradually slackened off to give the desired resistance value, while the ram compresses the small quantity of powder already in the sheath tube.

The valve will be open during the upward stroke of the ram, since the friction of the powder with the wall of the sheath tube just above the valve will be amply sufficient to prevent the valve remaining closed, and in fact this frictional force will tend to "pull" the powder through the valve and thereby ensure good flow of the powder. This may prove advantageous in the case of a powder which tends to "arch" readily and might therefore otherwise tend to hold in place and move bodily upwards with the ram. In this connection, it may be mentioned that any risk of "arching" of the powder within the ram head on ledges formed by the reduction in cross-section of the head due to the necessity for leaving the annular feed opening around it, is minimised by arranging that the ports $H^1$ extend upwardly beyond the first reduction in diameter, and friction with the surfaces of the core rods likewise tends to break down any "arching" that might occur. If desired, the internal surface of the head may be made smoothly conical as indicated at $H^5$ in Figure 6.

During the downward strokes of the ram, the valve will close, probably at a fairly early stage in the downstroke owing to friction with the sheath tube but in any event not later than the first engagement with the powder column in the sheath tube, and after such engagement the compressive thrust on the powder will commence. It should be mentioned that although the valve ring projects beyond the central portion of the operative face of the ram head, the compressive thrust on the powder will not be exerted only by the valve in the peripheral region, since the powder in practice flows fairly readily so that the whole end of the ram and valve unit will exert the thrust on the powder notwithstanding its irregular shape. The powder will thus be compacted firmly into the sheath tube C around the core rods $C^1$ during the downward strokes, a further charge of powder being introduced during each upward stroke. During the compression stroke, the compressive thrust of the ram on the powder will increase as the powder becomes tightly packed, until it finally exceeds the resistance of the friction grip, which will then allow the sheath tube and core rods to slip and move with the ram to the end of the compression stroke, the sheath tube thus being driven downwards by a step-by-step movement into the well B.

By suitably dimensioning the powder feed mechanism, the rate of powder supply can be so controlled that the sheath and core rods are displaced downwardly through approximately the same distance during each downward stroke of the ram, the amount of slip being determined by the amount of powder compressed. In this way, a uniformly compacted column of powder is gradually built up in the sheath tube around the core rods.

Owing to the provision of the valve, the amount of powder compressed during each downward stroke is properly controlled even if the feed into the top of the ram is uneven or not properly matched with the outflow at the bottom of the ram. The valve thus contributes materially towards ensuring a very even compression of the powder in the sheath tube.

When the sheath tube has been filled nearly to the top with powder and has therefore been moved down into the well nearly to its lowest position, the driving mechanism is stopped, and the friction grip is loosened to allow the sheath tube to be pulled down clear of the lower end of the ram. The upper end of the sheath tube is then at once sealed, and the filled workpiece thus formed is withdrawn from the well B in readiness for its further treatment. This further treatment consists of one or more stages of mechanical drawing, with such intermediate annealing as may be necessary, until the sheath tube, core rods and insulation have been sufficiently elongated and reduced in cross-section to produce the final sheathed cable. The mechanical drawing, of course, also assists in the consolidation and compacting of the insulating powder and, following the initial compacting by the ram, ensures a very high and uniform density to the powder filling throughout the finished cable.

It will be understood that the foregoing arrangement has been described by way of example only and may be modified in various ways within the scope of the invention.

Thus, for instance, it is not essential to the invention for the apparatus to be mounted vertically, provided that, if not, suitable arrangements are made to ensure proper flow of the powder. Further, it is not essential for the powder to be fed into the sheath tube through the interior of the ram.

Again, the valve may be arranged in ways other than those above described. Instead of being operated automatically during the upward and downward strokes of the ram, the valve may be positively operated by a member extending to the top of and through the ram, this member being moved either longitudinally or rotationally in timed relationship to the ram drive. Such positive operation prevents risk of faulty operation owing to the valve sticking. The longitudinal or rotational movement of the valve may be imparted by any of the well known methods. For instance, the longitudinal movement may be imparted as shown in Figures 7 and 8, wherein the valve $F^3$ cooperating with the ports $H^1$ in the head H is reciprocated by the cylinder E in accordance with the supply of compressed air acting between the fixed piston $E^7$ and the cylinder E. Thus, on the upward stroke the friction between the head H and the sheath C and the core rods $C^1$ will cause a delayed action of the ram F and leave the ports open. On the downward stroke, the reverse will happen and the friction between the said parts will tend to cause the ram to be delayed and the valve $F^3$ substantially to close the ports $H^1$. The rotary movement may be imparted, for example, as shown in Figures 9 and 10 wherein the valve $F^3$ is caused to rotate through 45° and back again in synchronism with the reciprocations of the ram F, by a pin L secured to the ram F cooperating with a cam groove L¹ in the valve F³. Thus, at each upward stroke, the ports in the valve are rotated into register with the ports H¹ on the head H and on each downward stroke are rotated out of register thereby closing the ports H¹ making it possible, if desired, to employ a rotary valve and thereby to obviate necessity for change of direction in the powder flow past the valve.

What I claim as my invention and declare to secure by Letters Patent is:

1. Apparatus for manufacturing electric cables or other insulated conductors, of the kind in which a metal sheath is insulated from at least one conducting core within it by pulverulent insulating material, comprising a ram within the sheath tube, an operative head detachably mounted on the ram and apertured to permit passage through it of at least one conducting core rod such ram head being provided with at least one feed opening, means for causing the insulating material in powder form to flow within the sheath tube past the ram and through such feed opening into the end of the sheath tube, means for imparting relative longitudinal reciprocating movement to the ram and the sheath tube whereby the ram head is caused to apply a compressive thrust to the powder column in the end of the sheath tube, and valve means located adjacent to the ram head for controlling the flow of powder through the said feed opening, such valve means including at least one member movable relatively to the ram head for intermittently closing the feed opening.

2. Apparatus as claimed in claim 1, in which the ram comprises a hollow tube on which the head is detachably mounted, and the powder is fed into the sheath tube through the hollow interior of the ram.

3. Apparatus for manufacturing electric cables or other insulated conductors of the kind in which a metal sheath is insulated from at least one conducting core within it by pulverulent insulating material, comprising a ram within the sheath tube having at least one feed opening in its operative head, means for causing the insulating material in powder form to flow within the sheath tube past the ram and through such feed opening into the end of the sheath tube, means for imparting relative longitudinal reciprocating movement to the ram and the sheath tube whereby the ram head is caused to apply a compressive thrust to the powder column in the end of the sheath tube, and a valve member so carried by the ram as to be freely movable thereon in the direction of the said reciprocating movement, such valve member acting intermittently to close the feed opening in the ram head and thereby to control the flow of powder therethrough.

4. Apparatus as claimed in claim 3, having means whereby the feeding means for the insulating material is operated in synchronism with the relative reciprocating movement between the ram and the sheath tube.

5. Apparatus for manufacturing electric cables or other insulated conductors of the kind in which a metal sheath is insulated from at least one conducting core within it by pulverulent insulating material, comprising a ram within the sheath tube having at least one feed opening in its operative head, means for causing the insulating material in powder form to flow within the sheath tube past the ram and through such feed opening into the end of the sheath tube, means for imparting relative longitudinal reciprocating movement to the ram and the sheath tube whereby the ram head is caused to apply a compressive thrust to the powder column in the end of the sheath tube, and a valve member cooperating with the feed opening in the ram head to control the flow of powder therethrough, such valve member being freely suspended from the ram whereby the feed opening will be closed not later than the commencement of the compressive thrust of the ram on the powder column in the end of the sheath tube and will open again not earlier than the retraction of the ram from such powder column.

6. Apparatus as claimed in claim 5, in which the ram comprises a hollow tube and an operative head detachably mounted on such tube, the head being apertured to permit passage through it of at least one conducting core rod.

7. Apparatus as claimed in claim 6, in which the insulating material is fed into the sheath tube through the hollow interior of the ram tube, the ram being provided with lateral ports through which the powder escapes from the interior of the ram tube to an annular space around the ram head and thence into the end of the sheath tube through the feed opening controlled by the valve member.

8. Apparatus for manufacturing electric cables or other insulated conductors of the kind in which a metal sheath is insulated from at least one conducting core within it by pulverulent insulating material, comprising a ram within the sheath tube having at least one feed opening in its operative head, means for causing the insulating material in powder form to flow within the sheath tube past the ram and through such feed opening into the end of the sheath tube, means for imparting relative longitudinal reciprocating movement to the ram and the sheath tube whereby the ram head is caused to apply a compressive thrust to the powder column in the end of the sheath tube, and valve means controlling the flow of powder through the said feed opening, such valve means comprising a relatively fixed part on the ram head and a cooperating relatively movable part so suspended from the ram as to be free to move longitudinally relatively thereto.

9. Apparatus as claimed in claim 8, in which one of the two cooperating parts of the valve has a conical face to assist in proper centering of the parts.

10. Apparatus as claimed in claim 8, in which a relatively sharp edge on one of the two cooperating parts of the valve cooperates for closure purposes with a face formed on the other of said parts.

11. Apparatus as claimed in claim 8, in which the relatively movable part of the valve comprises a ring having a conical face formed on its inner surface for cooperation with the peripheral edge of the ram head.

12. Apparatus as claimed in claim 8, in which the relatively movable part of the valve comprises a ring having an upstanding edge for cooperation with a flat portion of the operative face of the ram head.

13. Apparatus for manufacturing electric cables or other insulated conductors of the kind in which a metal sheath is insulated from at least one conducting core within it by pulverulent insulating material, comprising a ram within the sheath tube having at least one feed opening in its operative head, means for causing the insulating material in powder form to flow within the sheath tube past the ram and through such feed opening into the end of the sheath tube, means for imparting relative longitudinal reciprocating movement to the ram and the sheath tube whereby the ram head is caused to apply a compressive thrust to the powder column in the end of the sheath tube, a frictional abutment in operative engagement with one of the two elements comprising the ram and the sheath tube and opposing the compressive thrust of the ram on the powder column, the said abutment being adapted to yield when such thrust exceeds a predetermined value, and valve means located adjacent to the ram head for controlling the flow of powder through the said feed opening, such valve means including at least one member movable relatively to the ram head for intermittently closing the feed opening.

14. Apparatus as claimed in claim 13, in which the valve means comprises a relatively fixed part on the ram head and a cooperating relatively movable part so carried by the ram as to be freely movable thereon in the direction of the reciprocating movements.

15. Apparatus as claimed in claim 13, in which the ram comprises a hollow tube provided in the neighbourhood of its operative head with lateral ports leading to an annular space around the ram head, and the insulating material is fed through the interior of the ram tube and through the ports into such annular space and thence into the end of the sheath tube through the feed opening controlled by the valve means.

References Cited in the file of this patent

UNITED STATES PATENTS

| Number | Name | Date |
|---|---|---|
| 746,407 | Thyberg et al. | Dec. 8, 1903 |
| 1,135,825 | Leigh | Apr. 13, 1915 |
| 1,458,764 | Johnson | June 12, 1923 |
| 1,487,683 | Marsh | Mar. 18, 1924 |
| 1,547,336 | Lightfoot et al. | July 28, 1925 |
| 1,823,180 | White et al. | Sept. 15, 1931 |
| 1,897,612 | Helfrecht | Feb. 14, 1933 |
| 2,134,614 | Lafferty | Oct. 25, 1938 |
| 2,277,321 | Harris | Mar. 24, 1942 |
| 2,445,035 | Munger et al. | July 13, 1948 |

FOREIGN PATENTS

| Number | Country | Date |
|---|---|---|
| 456,323 | Great Britain | Nov. 6, 1936 |